United States Patent
Lin (10) Patent No.: US 10,621,325 B2
(45) Date of Patent: *Apr. 14, 2020

(54) METHOD AND APPARATUS FOR CONTROLLING FLEXIBLE SCREEN, AND ELECTRONIC DEVICE

(71) Applicant: GUANGDONG OPPO MOBILE TELECOMMUNICATIONS CORP., LTD., Dongguan, Guangdong (CN)

(72) Inventor: Yugui Lin, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/427,338

(22) Filed: May 30, 2019

(65) Prior Publication Data

US 2019/0286800 A1    Sep. 19, 2019

Related U.S. Application Data

(63) Continuation of application No. 16/313,281, filed as application No. PCT/CN2017/089625 on Jun. 22, 2017.

(30) Foreign Application Priority Data

Jul. 8, 2016   (CN) .......................... 2016 1 0539092

(51) Int. Cl.
*G06F 21/32*   (2013.01)
*H04L 29/06*   (2006.01)
(Continued)

(52) U.S. Cl.
CPC ............ *G06F 21/32* (2013.01); *G06F 3/0488* (2013.01); *G06F 21/84* (2013.01); *G06K 9/00067* (2013.01); *H04L 63/0861* (2013.01)

(58) Field of Classification Search
CPC ........ G06F 21/32; G06F 3/0488; G06F 21/84; G06K 9/00067; H04L 63/0861
See application file for complete search history.

(56) References Cited

U.S. PATENT DOCUMENTS 9,483,682 B1 * 11/2016 Chiang .............. G06K 9/00087
2013/0324089 A1   12/2013 Kim et al.
(Continued)

FOREIGN PATENT DOCUMENTS

| CN | 103558974 | 2/2014 |
| CN | 103902042 | 7/2014 |

(Continued)

OTHER PUBLICATIONS

SIPO, First Office Action for CN Application No. 201610539092, dated Jun. 20, 2018.
(Continued)

*Primary Examiner* — Bobbak Safaipour
(74) *Attorney, Agent, or Firm* — Hodgson Russ LLP (57) ABSTRACT

Embodiments of the present disclosure provide a method and an apparatus for controlling a flexible screen and an electronic device. The electronic device is provided with the flexible screen and a fingerprint sensor. The method includes: obtaining fingerprint data when the fingerprint sensor is pressed; matching the fingerprint data with preset fingerprint data; and unfolding the flexible screen when the fingerprint data matches the preset fingerprint data.

15 Claims, 6 Drawing Sheets electronic device                                    button (51) Int. Cl.
  *G06F 21/84* (2013.01)
  *G06F 3/0488* (2013.01)
  *G06K 9/00* (2006.01)

(56) References Cited

U.S. PATENT DOCUMENTS

2016/0026219 A1* 1/2016 Kim .................... H04M 1/0245
                                                        345/173
2017/0337419 A1* 11/2017 Zhang ..................... G06K 9/00

FOREIGN PATENT DOCUMENTS

| CN | 104834520 | 8/2015 |
|---|---|---|
| CN | 105116996 | 12/2015 |
| CN | 105160228 | 12/2015 |
| CN | 105302238 | 2/2016 |
| CN | 105335641 | 2/2016 |
| CN | 105426722 | 3/2016 |
| CN | 105653923 | 6/2016 |
| CN | 105677203 | 6/2016 |
| CN | 105678142 | 6/2016 |
| CN | 106203045 | 12/2016 |
| EP | 2530941 | 12/2012 |
| EP | 2981050 | 2/2016 |

OTHER PUBLICATIONS

NIPO, ISR for PCT/CN2017/089625, dated Sep. 29, 2017.
Notification to Grant Patent Right for Invention for CN Application No. 201610539092, dated Jan. 22, 2019.
EPO, Office Action for EP Application No. 17823524.8, dated Jun. 3, 2019.

* cited by examiner

METHOD AND APPARATUS FOR CONTROLLING FLEXIBLE SCREEN, AND ELECTRONIC DEVICE

CROSS-REFERENCE TO RELATED APPLICATIONS

This application is a continuation of U.S. application Ser. No. 16/313,281, filed Dec. 26, 2018, which is a U.S. national phase application of International Application No. PCT/CN2017/089625, filed Jun. 22, 2017, which claims priority to Chinese Patent Application No. 201610539092.X, filed Jul. 8, 2016. The entire disclosures of the aforementioned applications are incorporated herein by reference.

FIELD

The present disclosure relates to the field of electronic device technologies, and more particularly to a method and an apparatus for controlling a flexible screen of an electronic device and an electronic device.

BACKGROUND

With the rapid development of information technologies, electronic devices (such as mobile phones and tablet computers) are upgraded faster and faster, and a development trend of display screens of the electronic devices is adopting flexible screens as the displaying screens. The flexible screen is also referred to as a flexible display screen, which has features of light weight, bendability, and portability, and thus has become a future development direction of the display screen.

SUMMARY

Embodiments of a first aspect of the present disclosure provide a method for controlling a flexible screen of an electronic device. The method is applicable to an electronic device provided with a flexible screen and a fingerprint sensor, and the method includes: obtaining fingerprint data when the fingerprint sensor is pressed; matching the fingerprint data with preset fingerprint data; and executing an unfolding operation on the flexible screen when the fingerprint data matches the preset fingerprint data.

Embodiments of a second aspect of the present disclosure provide an apparatus for controlling a flexible screen of an electronic device. The apparatus is applicable to an electronic device provided with a flexible screen and a fingerprint sensor, and includes a processor and a memory configured to store instructions executable by the processor. The processor is configured to run a program corresponding to the instructions by reading the instructions stored in the memory, so as to: obtain fingerprint data when the fingerprint sensor is pressed; match the fingerprint data with preset fingerprint data; and execute an unfolding operation on the flexible screen when the fingerprint data matches the preset fingerprint data.

Embodiments of a third aspect of the present disclosure provide an electronic device. The electronic device includes a winding tube, a flexible screen, a fingerprint sensor, a motor and a control circuit. The flexible screen is operable to wind around the winding tube. The fingerprint sensor is configured to obtain fingerprint data when the fingerprint sensor is pressed. The control circuit is coupled with the flexible screen and the motor respectively, and configured to receive the fingerprint data, to match the fingerprint data with preset fingerprint data, and to drive the motor to rotate to execute an unfolding operation on the flexible screen when the fingerprint data matches the preset fingerprint data.

In a fourth aspect, a computer readable storage medium is provided. The computer readable storage medium is stored with computer programs for electronic data exchange, wherein the computer programs are configured to cause a processor to execute all or a part of operations described in embodiments of the first aspect of the present disclosure.

EMBODIMENTS OF THE PRESENT DISCLOSURE

At present, a flexible screen (including a touch screen and a display screen) has been provided for an electronic device. However, since the electronic device with the flexible screen has a small size, it is difficult to find the electronic device if the electronic device is lost. Then, once the electronic device is lost, it is easy to cause leakage of user information. Therefore, how to improve security of the electronic device needs to be solved. The present disclosure provides a method and an apparatus for controlling a flexible screen of an electronic device and an electronic device, which can improve the security of the electronic device.

The electronic device described in embodiments of the present disclosure may include a smartphone (such as Android Phone, iOS Phone, and Windows Phone), a tablet computer, a PDA (personal digital assistant), a notebook computer, a MID (mobile internet device), or a wearable device. The above electronic devices are exemplary, and are not exhaustive. The electronic devices are not limited to these. It should be noted that, each of the above electronic devices is provided with the flexible screen and a fingerprint sensor.

Figure 1:
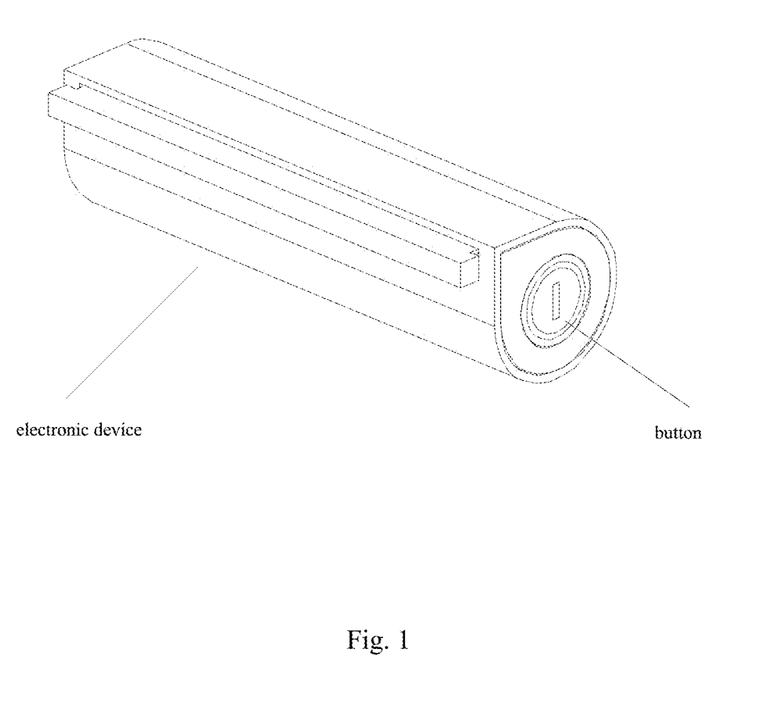
FIG. 1 is a schematic diagram of an electronic device according to embodiments of the present disclosure.
Figure 2:
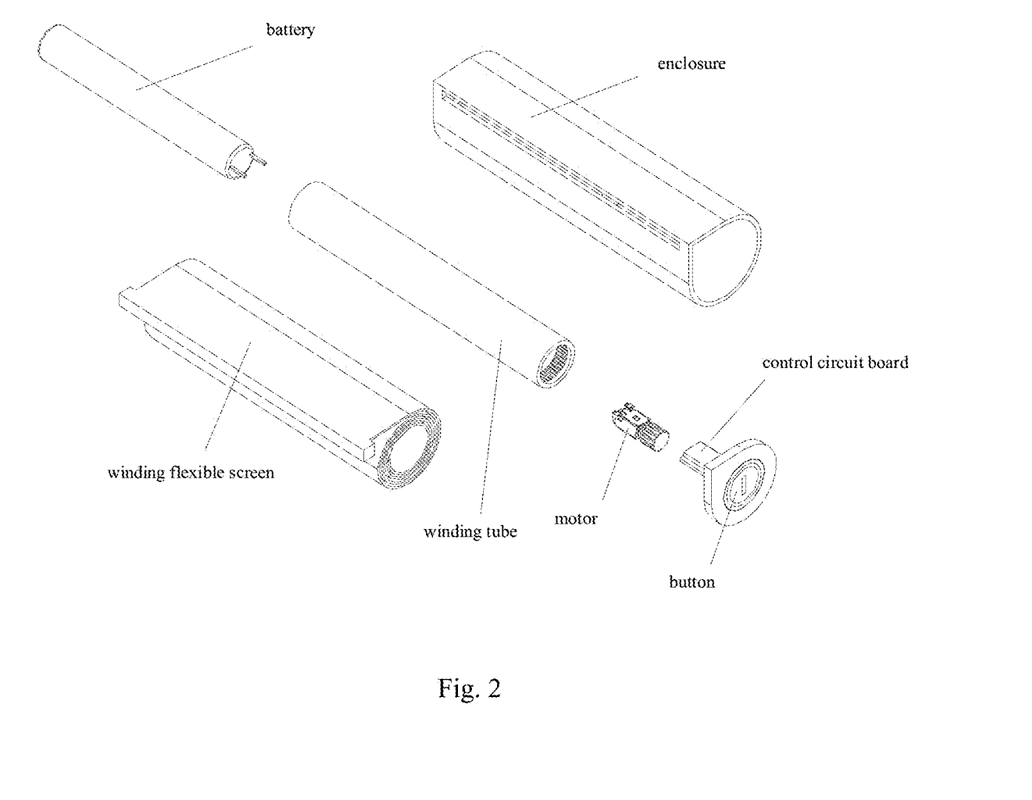
FIG. 2 is a schematic diagram of components of the electronic device in FIG. 1a according to embodiments of the present disclosure.

It should be noted that, as illustrated in FIG. 1, which shows an electronic device, the electronic device includes a button. In embodiments of the present disclosure, the button is integrated with a fingerprint sensor. The specific structure of the electronic device is as illustrated in FIG. 2, which includes a winding flexible screen, a winding tube (hollow), a battery, a motor, an enclosure, a control circuit board, and a button. The winding flexible screen is winded around the winding tube. The battery may be inserted into the winding tube from one end. The motor, the control circuit board and the button may be installed from the other end. The control circuit board is configured to control the motor to rotate. The button is configured to activate the control circuit board. When a user presses the button, the control circuit board may be used to drive the motor to rotate, drive the winding tube to rotate, and thus fold the flexible screen. The button may be a physical button or a touch button, or a sensor, which in embodiments of the present disclosure may be, a fingerprint sensor, or a fingerprint sensor integrated with a pressure sensor.

In embodiments of the present disclosure, the flexible screen may be fully unfolded or partially unfolded. When the flexible screen is fully unfolded, the full flexible screen may be used for display. When the flexible screen is partially unfolded, a part of the flexible screen may be used for display. When a part of the flexible screen is used for display, it is possible to provide more choices for the user to some extent, and it is interesting, and moreover, it has a certain security, since it is uneasy for others to steal information from the small screen.

Figure 3:
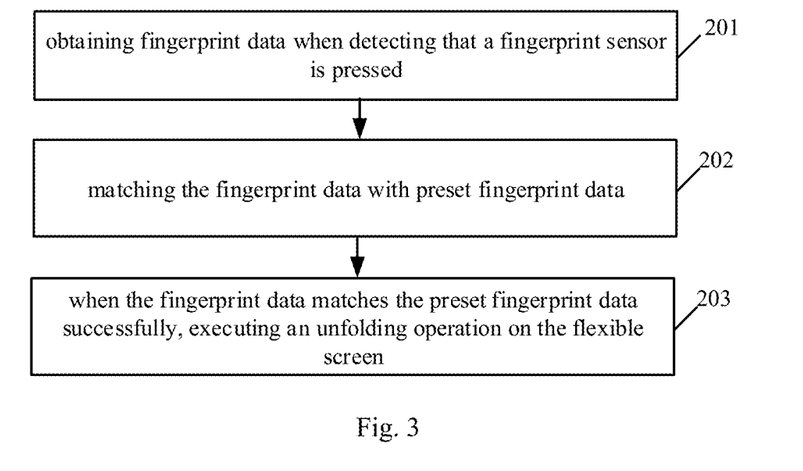
FIG. 3 is a flow chart of a method for controlling a flexible screen of an electronic device according to a first embodiment of the present disclosure.

Based on the above electronic device, as illustrated in FIG. 3, the method for controlling the flexible screen of the electronic device described in a first embodiment includes following operations.

At block 201, fingerprint data is obtained when the fingerprint sensor is pressed.

The electronic device described in embodiments of the present disclosure may be provided with the fingerprint sensor. The fingerprint sensor may be provided at any position of the electronic device, for example, integrated in the button as illustrated in FIG. 1.

In some embodiments, when the user presses the fingerprint sensor, a corresponding press parameter (for example, a press duration, a number of presses, and the like) may be obtained, and a fingerprint image may also be obtained. Therefore, the fingerprint data may include the fingerprint image and/or the press parameter.

In some embodiments, the press parameter of pressing the fingerprint sensor may include, but is not limited to, at least one of the number of presses, the press intensity, the press duration, and the press area. The number of presses may be the number of presses of pressing the fingerprint sensor within a preset time period. The press intensity may be a maximum press intensity or a mean press intensity of pressing the motor drive switch during a process from the user contacting with the fingerprint sensor to leaving the fingerprint sensor, or a press intensity at a certain time point. For example, if the time point is 0.01 s, and the duration of the user pressing the fingerprint sensor is 2 s, then the press intensity corresponding to this press process is the press intensity of pressing the fingerprint sensor at 0.01 s. The press duration may be an entire time period from the user contacting with the fingerprint sensor to leaving the fingerprint sensor, or, the press duration may be a time period corresponding to the press intensity in a certain range in a process from the user contacting with the fingerprint sensor to leaving the fingerprint sensor (an intensity change curve during the press process may be obtained, and then the time period in which the press intensity is in the certain range may be counted according to the intensity change curve). The press area may be a maximum press area, a mean press area, or a minimum press area of pressing the fingerprint sensor during a process from the user contacting with the fingerprint sensor to leaving the fingerprint sensor, or a press area at a certain time point. For example, if the time point is 0.01 s, and the press duration of pressing the fingerprint sensor is 2 s, then the press area corresponding to the press process is the press area of pressing the fingerprint sensor at 0.01 s.

Further, when the fingerprint sensor is a touch switch, the press parameter may be number of touch points of touching the fingerprint sensor. For example, when the fingerprint sensor is pressed with one finger, the number of touch points is 1; when the fingerprint sensor is pressed with two fingers, the number of touch points is 2; when the fingerprint sensor is pressed with three fingers, the number of touch points is 3, and so on.

At block 202, the fingerprint data is matched with preset fingerprint data.

In some embodiments, the preset fingerprint data may be stored in advance, i.e., the preset fingerprint data may be input in advance before executing embodiments of the present disclosure. The preset fingerprint data may include the press parameter and/or the fingerprint image detected when the user presses the fingerprint sensor.

In some embodiments, when the preset fingerprint data is a preset fingerprint image, the fingerprint image may be obtained, and the fingerprint image is matched with the preset fingerprint image. In detail, feature points of the fingerprint image and feature points of the preset fingerprint image may be extracted, and then the feature points of the fingerprint image may be matched with the feature points of the preset fingerprint image. When the matching succeeds, the operation at block 203 may be executed. The feature points may be extracted by means of a Harris corner extraction algorithm, or a SIFT (Scale Invariant Feature Transform) algorithm.

In some embodiments, the preset fingerprint data includes the preset press parameter and the preset fingerprint image. The press parameter and the fingerprint image may be obtained when the user presses the fingerprint sensor, and the press parameter may be matched with the preset press parameter, and the fingerprint image may be matched with the preset fingerprint image. In some embodiments, two processes or threads may be used to match the fingerprint data with the preset fingerprint data, one process or thread being used to match the press parameter with the preset press parameter, the other process or thread being used to match the fingerprint image with the preset fingerprint image, and the two processes or threads being executed in parallel.

At block 203, when the fingerprint data matches the preset fingerprint data successfully, unfolding operation is executed on the flexible screen.

In some embodiments, the flexible screen may be unfolded in following two ways.

In the first way, the electronic device is unlocked by fingerprint, and then the user may manually unfold the flexible screen. In this way, if the fingerprint data fails to match the preset fingerprint data, it is unable to execute the unfolding operation on the flexible screen.

In the second way, the electronic device is unlocked, and afterwards, the electronic device performs the unfolding operation of the flexible screen.

Certainly, before the operation at block 201, an application bound with the preset fingerprint data may be set. After the folding operation of the flexible screen is executed, a specified page of the application bound with the preset fingerprint data may be directly displayed on the display screen, in which the specified page may be a home page of the application, or any other page.

In some embodiments, when the fingerprint data fails to match with the preset fingerprint data, the user is prompted to press the fingerprint sensor again. The electronic device may be provided with a flash lamp. When the fingerprint data fails to match the preset fingerprint data, the flash lamp may flash many times. In some embodiments, the electronic device may be provided with a buzzer. When the fingerprint data fails to match the preset fingerprint data, the buzzer may make a sound. Certainly, there are many other ways for prompting the user, which will not be elaborated here.

It can be seen that, in embodiments of the present disclosure, the fingerprint data is obtained when the fingerprint sensor is pressed, the fingerprint data is matched with the preset fingerprint data, and the unfolding operation is executed on the flexible screen when the fingerprint data matches the preset fingerprint data successfully. Thus, the electronic device with the flexible screen can be provided with the fingerprint sensor, and the flexible screen may be unfolded only when the obtained fingerprint data matches the preset fingerprint data successfully, thus improving security of the electronic device.

Figure 4:
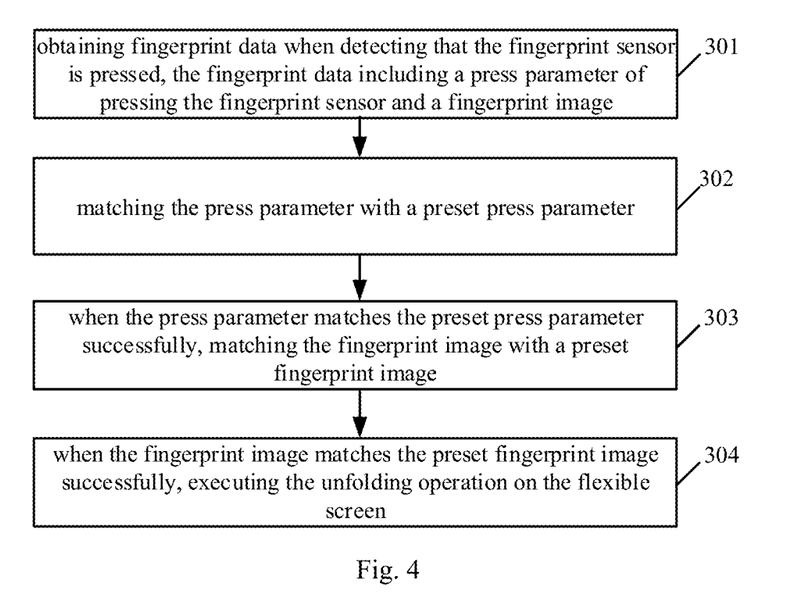
FIG. 4 is a flow chart of a method for controlling a flexible screen of an electronic device according to a second embodiment of the present disclosure.

FIG. 4 is a flow chart of a method for controlling a flexible screen of an electronic device according to a second embodiment of the present disclosure. As illustrated in FIG. 3, the method described in this embodiment includes following operations.

At block 301, the fingerprint data is obtained when the fingerprint sensor is pressed, in which the fingerprint data includes the press parameter of pressing the fingerprint sensor and the fingerprint image.

At block 302, the press parameter is matched with the preset press parameter.

At block 303, when the press parameter matches the preset press parameter successfully, the fingerprint image is matched with the preset fingerprint image.

At block 304, when the fingerprint image matches the preset fingerprint image successfully, the unfolding operation is executed on the flexible screen.

At first, the press parameter may be matched with the preset press parameter at block 302. For example, when the press parameter is the press intensity, it may be determined whether the press intensity matches a preset press intensity. For example, when the preset press intensity is 30~35N, and the press intensity is 32N, the matching is successful. For another example, when the press parameter includes the press duration and the press intensity, it may be determined whether the press duration matches a preset press duration and whether the press intensity matches a preset press intensity. When the press parameter matches the preset press parameter successfully, the fingerprint image may be matched with the preset fingerprint image. Since the matching of the fingerprint data is divided into two steps, in the first step, the press parameter being matched with the preset press parameter, and in the second step, the fingerprint image being matched with the preset fingerprint image when the matching in the first step is successful. Therefore, the security of the electronic device may be improved.

In regard to specific description of other operations in FIG. 4, reference may be made to specific description of respective operations in the embodiment illustrated in FIG. 3, which will not be elaborated here.

Figure 5:
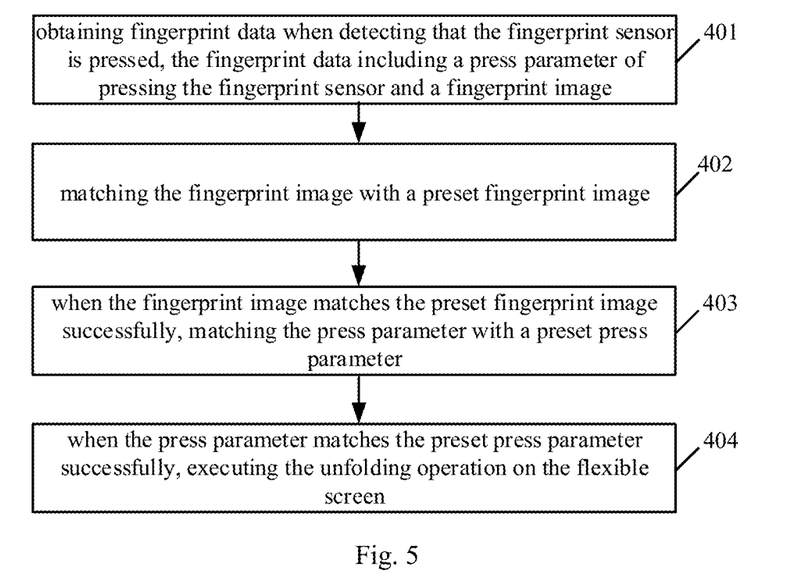
FIG. 5 is a flow chart of a method for controlling a flexible screen of an electronic device according to a third embodiment of the present disclosure.

FIG. 5 is a flow chart of a method for controlling a flexible screen of an electronic device according to a third embodiment of the present disclosure. As illustrated in FIG. 5, the method described in this embodiment includes following operations.

At block 401, the fingerprint data is obtained when the fingerprint sensor is pressed, in which the fingerprint data includes the press parameter of pressing the fingerprint sensor and the fingerprint image.

At block 402, the fingerprint image is matched with the preset fingerprint image.

At block 403, when the fingerprint image matches the preset fingerprint image successfully, the press parameter is matched with the preset press parameter.

At block 404, when the press parameter matches the preset press parameter successfully, the unfolding operation is executed on the flexible screen.

At first, the fingerprint image may be matched with the preset fingerprint image at block 402.

When the matching is successful, the press parameter is then matched with the preset press parameter. For example, when the press parameter is the press intensity, it may be determined whether the press intensity matches a preset press intensity. For example, when the preset press intensity is 30~35N, and the press intensity is 32N, the matching is successful. For another example, when the press parameter includes the press duration and the press intensity, it may be determined whether the press duration matches a preset press duration and whether the press intensity matches a preset press intensity. Since the matching of the fingerprint data is divided into two steps, in the first step, the fingerprint image being matched with the preset fingerprint image, and in the second step, the press parameter being matched with the preset press parameter when the matching in the first step is successful, the security of the electronic device may be improved.

In actual implementation, the fingerprint image may be copied, and thus the security of the electronic device is reduced. However, in this embodiment, when the fingerprint image matches the preset fingerprint image successfully, it also needs to match the press parameter with the preset press parameter, and thus the security of the electronic device is further improved. In regard to specific description of other operations in FIG. 5, reference may be made to specific description of respective operations in the embodiment illustrated in FIG. 3, which will not be elaborated here.

Figure 6:
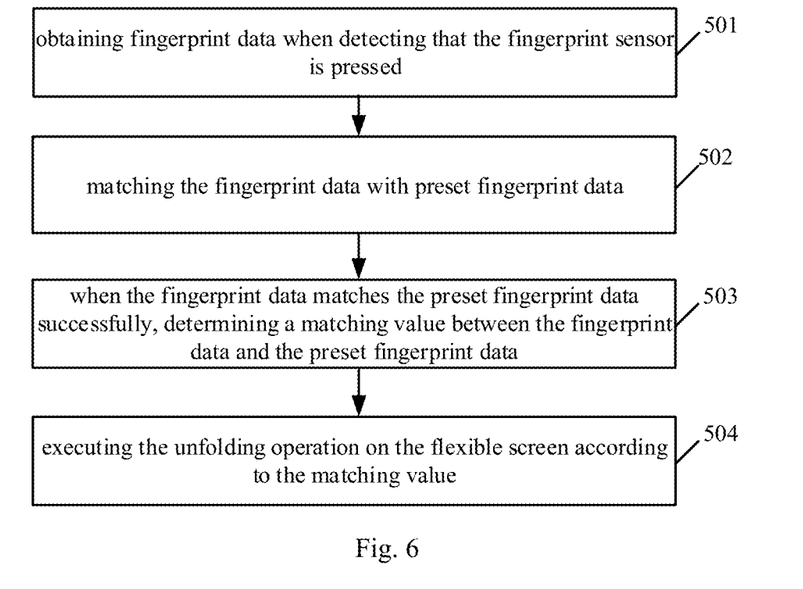
FIG. 6 is a flow chart of a method for controlling a flexible screen of an electronic device according to a fourth embodiment of the present disclosure.

FIG. 6 is a flow chart of a method for controlling a flexible screen of an electronic device according to a fourth embodiment of the present disclosure. As illustrated in FIG. 6, the method described in this embodiment includes following operations.

At block 501, the fingerprint data is obtained when it is detected that the fingerprint sensor is pressed.

At block 502, the fingerprint data is matched with the preset fingerprint data.

At block 503, when the fingerprint data matches the preset fingerprint data successfully, a matching value between the fingerprint data and the preset fingerprint data is determined.

At block 504, the unfolding operation is executed on the flexible screen according to the matching value.

When the fingerprint data is matched with the preset fingerprint data at block 503, the matching value between the two can be directly obtained, which will not be elaborated here.

In some embodiments, the operation at block 504 may include followings.

41) When the matching value is greater than a preset threshold, the flexible screen is fully unfolded, in which the matching value is greater than a fingerprint unlock threshold.

42) When the matching value is less than or equal to the preset threshold and greater than the fingerprint unlock threshold, an unfolding factor of the flexible screen corresponding to the matching value is determined according to a formula of unfolding factor=(matching value−fingerprint unlock threshold)/(preset threshold−fingerprint unlock threshold), and the unfolding operation is executed on the flexible screen according to the unfolding factor.

At 41), the fingerprint unlock threshold is a preset matching threshold between the fingerprint data and the preset fingerprint data. When the matching value between the fingerprint data input by the user and the preset fingerprint data is greater than the fingerprint unlock threshold, the electronic device may be unlocked by fingerprint, and otherwise, the electronic device cannot be unlocked by fingerprint. Certainly, the preset threshold may also be set, in which the preset threshold is greater than the fingerprint unlock threshold. When the matching value is greater than the preset threshold, the flexible screen may be fully unfolded. When the matching value is between the preset threshold and the fingerprint unlock threshold, the unfolding factor of the flexible screen can be determined according to the above formula. The closer to the preset threshold the matching value is, the greater the unfolding factor is, and the more far away from the preset threshold the matching value is, the smaller the unfolding factor is. For example, assume that the fingerprint unlock threshold is 0.8, and the preset threshold is 0.9. If the matching value is 0.85, the unfolding factor is 0.5, and when the unfolding operation is executed on the flexible screen according to the unfolding factor, the flexible screen is merely unfolded to a size half of that when the flexible screen is fully unfolded. If the matching value is 0.81, the unfolding factor is 0.1, and the flexible screen is merely unfolded a little bit. In some embodiments, when the flexible screen is not fully unfolded, the flexible screen can be stretched manually, to further unfold the flexible screen.

In regard to specific description of other operations in FIG. 6, reference may be made to specific description of respective operations in the embodiment illustrated in FIG. 3, which will not be elaborated here.

Embodiments of the present disclosure also provide an apparatus for controlling a flexible screen of an electronic device.

Figure 7:
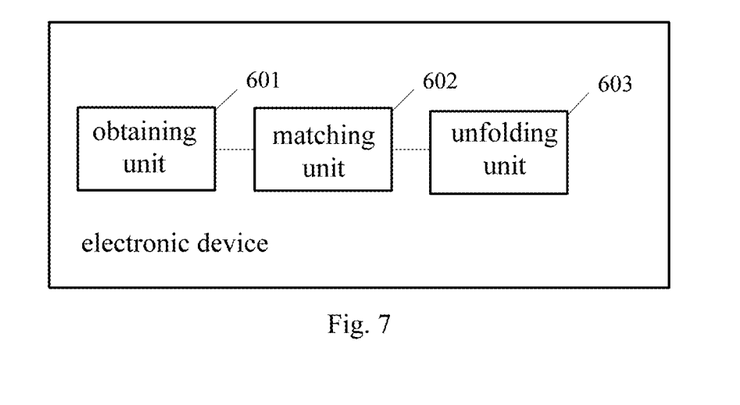
FIG. 7 is a block diagram of an apparatus for controlling a flexible screen of an electronic device according to a first embodiment of the present disclosure.

Please refer to FIG. 7, which is a block diagram of an apparatus for controlling a flexible screen of an electronic device according to a first embodiment of the present disclosure. The apparatus described in this embodiment includes an obtaining unit 601, a matching unit 602 and an unfolding unit 603. The apparatus illustrated in FIG. 7 is applicable to an electronic device provided with a flexible screen and a fingerprint sensor.

The obtaining unit 601 is configured to obtain fingerprint data when the fingerprint sensor is pressed.

The matching unit 602 is configured to match the fingerprint data obtained by the obtaining unit 601 with preset fingerprint data.

The unfolding unit 603 is configured to execute an unfolding operation on the flexible screen when a matching result of the matching unit 602 is that the fingerprint data matches the preset fingerprint data successfully.

In at least one embodiment, the obtaining unit 601 is configured to obtain a fingerprint image and a press parameter of pressing the fingerprint sensor.

In some embodiments, the matching unit 602 is configured to: match the press parameter with a preset press parameter; and match the fingerprint image with a preset fingerprint image when the press parameter matches the preset press parameter successfully.

In other embodiments, the matching unit 602 is configured to: match the fingerprint image with a preset fingerprint image; and match the press parameter with a preset press parameter when the fingerprint image matches the preset fingerprint image successfully.

Figure 8:
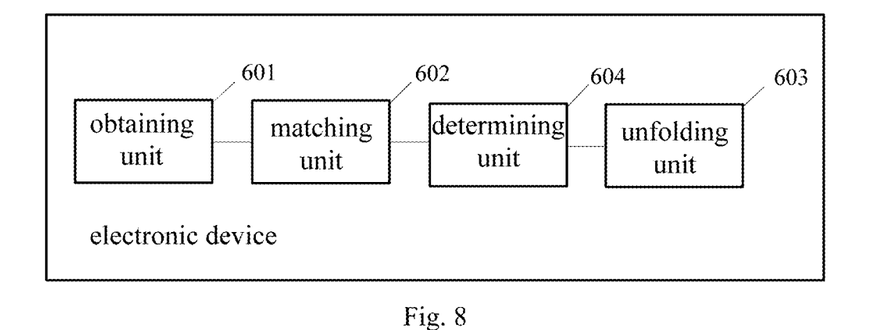
FIG. 8 is a block diagram of an apparatus for controlling a flexible screen of an electronic device according to a second embodiment of the present disclosure.

In some embodiments, as illustrated in FIG. 8, the apparatus illustrated in FIG. 7 may further include a determining unit 604.

The determining unit 604 is configured to determine a matching value between the fingerprint data and the preset fingerprint data before the unfolding unit 603 executes the unfolding operation on the flexible screen.

The unfolding unit 603 is configured to execute the unfolding operation on the flexible screen according to the matching value.

Further, the unfolding unit 603 is configured to: fully unfold the flexible screen when the matching value is greater than a preset threshold and greater than a fingerprint unlock threshold; and unfold the flexible screen according to an unfolding factor corresponding to the matching value when the matching value is less than or equal to the preset threshold and greater than the fingerprint unlock threshold, wherein unfolding factor=(matching value−fingerprint unlock threshold)/(preset threshold−fingerprint unlock threshold).

Figure 9:
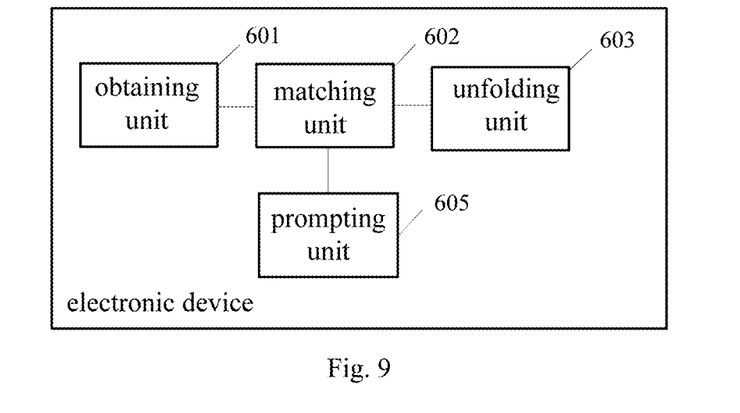
FIG. 9 is a block diagram of an apparatus for controlling a flexible screen of an electronic device according to a third embodiment of the present disclosure.

In some embodiments, as illustrated in FIG. 9, the apparatus illustrated in FIG. 7 may further include a prompting unit 605.

The prompting unit 605 is configured to prompt a user to press the fingerprint sensor again when a matching result of the matching unit 602 is that the fingerprint data fails to match the preset fingerprint data.

It can be seen that, the apparatus described in embodiments of the present disclosure may obtain the fingerprint data when the fingerprint sensor is pressed, match the fingerprint data with the preset fingerprint data, and execute the unfolding operation on the flexible screen when the fingerprint data matches the preset fingerprint data successfully. Therefore, the electronic device with the flexible screen can be provided with the fingerprint sensor, and the flexible screen may be unfolded only when the obtained fingerprint data matches the preset fingerprint data successfully, thus improving security of the electronic device.

It can be understood that, functions of respective program modules of the electronic device in this embodiment may be executed according to above method embodiments, with respect to the specific implementation of which, reference can be made to related description of the above method embodiments, which will not be elaborated here.

Figure 10:
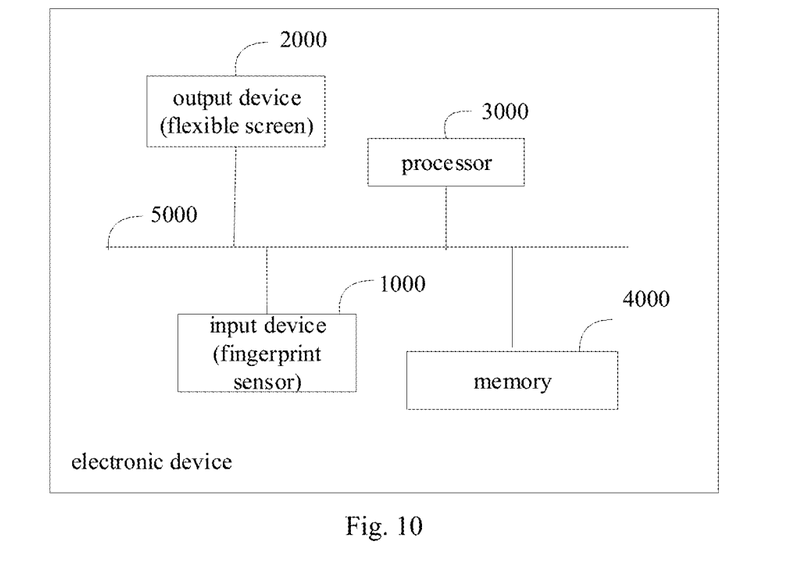
FIG. 10 is a block diagram of an electronic device according to a first embodiment of the present disclosure.

Please refer to FIG. 10, which is a block diagram of an electronic device according to a first embodiment of the present disclosure. The electronic device described in this embodiment includes: at least one input device 1000; at least one output device 2000; at least one processor 3000, for example, CPU; and a memory 4000. The above input device 1000, output device 2000, processor 3000 and memory 4000 are coupled via a bus 5000.

The input device 1000 may be a touch panel, a physical button, or a mouse, a fingerprint sensor, or the like.

The output device 2000 may be a flexible screen.

The memory 4000 may be a high speed RAM, or may be a non-volatile memory, for example, a disk memory. The memory 4000 is configured to store a set of program codes. The input device 1000, the output device 2000 and the processor 3000 are configured to call the program codes stored in the memory 4000, to execute following operations.

The processor 3000 is configured to: obtain fingerprint data when detecting that the fingerprint sensor is pressed; match the fingerprint data with preset fingerprint data; and when the fingerprint data matches the preset fingerprint data successfully, execute unfolding operation on the flexible screen.

In at least one embodiment, the processor 3000 is configured to obtain the fingerprint data by: obtaining a fingerprint image and a press parameter of pressing the fingerprint sensor.

In at least one embodiment, the processor 3000 is configured to match the fingerprint data with the preset fingerprint data, by: matching the press parameter with a preset press parameter; and matching the fingerprint image with a preset fingerprint image when the press parameter matches the preset press parameter successfully.

In at least one embodiment, the processor 3000 is configured to match the fingerprint data with the preset fingerprint data, by: matching the fingerprint image with a preset fingerprint image; and matching the press parameter with a preset press parameter when the fingerprint image matches the preset fingerprint image successfully.

In at least one embodiment, before executing the unfolding operation on the flexible screen, the processor 3000 is further configured to: determining a matching value between the fingerprint data and the preset fingerprint data; and executing the unfolding operation on the flexible screen according to the matching value.

In at least one embodiment, the processor 3000 is configured to execute the unfolding operation on the flexible screen, by: fully unfolding the flexible screen when the matching value is greater than a preset threshold and greater than a fingerprint unlock threshold; unfolding the flexible screen according to an unfolding factor corresponding to the matching value when the matching value is less than or equal to the preset threshold and greater than the fingerprint unlock threshold, wherein unfolding factor=(matching value−fingerprint unlock threshold)/(preset threshold−fingerprint unlock threshold).

In at least one embodiment, the processor 3000 is further configured to: prompt a user to press the fingerprint sensor again when the fingerprint data fails to match the preset fingerprint data.

Figure 11:
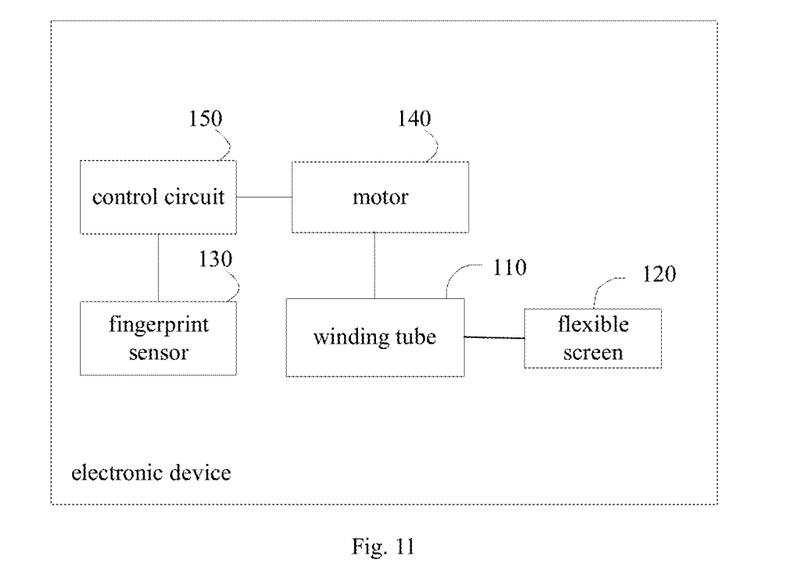
FIG. 11 is a block diagram of an electronic device according to a second embodiment of the present disclosure.

FIG. 11 is a block diagram of an electronic device according to a second embodiment of the present disclosure. As illustrated in FIG. 11, the electronic device includes a winding tube 110, a flexible screen 120, a fingerprint sensor 130, a motor 140 and a control circuit 150.

The flexible screen 120 is operable to wind around the winding tube 110. The fingerprint sensor 130 is configured to obtain fingerprint data when the fingerprint sensor 130 is pressed. The motor 140 is coupled to the winding tube 110. The control circuit 150 is coupled to the fingerprint sensor 130 and the motor 140 respectively, and is configured to receive the fingerprint data, to match the fingerprint data with preset fingerprint data, and to drive the motor 140 to rotate to execute an unfolding operation on the flexible screen 120 when the fingerprint data matches the preset fingerprint data.

The control circuit 150 may work similar to those described in method embodiments, which will not be elaborated here.

Embodiments of the present disclosure further provide a computer storage medium. The computer storage medium is stored with computer programs for electronic data exchange. The computer programs are configured to cause a computer to execute all or a part of operations of any control method of an electronic device disclosed in above method embodiments.

Embodiments of the present disclosure further provide a computer program product. The computer program product includes a non-transitory computer readable storage medium stored with computer programs. The computer programs are operable to cause a computer to execute all or a part of operations of any control method of an electronic device disclosed in above method embodiments.

Although the present disclosure is described here in combination with respective embodiments, those skilled in the art may understand and implement other variants of the disclosed embodiments by viewing the drawings, the disclosure, and the appending claims during implementing the claimed inventions. In the claims, the term "comprising" does not exclude other components or steps, "a" or "an" does not exclude a plural form. A single processor or other units may implement several functions listed in the claims. Some measures are disclosed in mutually different dependent claims, but this does not imply that these measures cannot be combined to produce a better effect.

Those skilled in the art should understand that, embodiments of the present disclosure may be provided as a method, an apparatus (device) or a computer program product. Thus, the present disclosure may be implemented in a form of hardware, software, or a combination of hardware and software. Moreover, the preset disclosure may be implemented in a form of computer program product implemented on one or more computer accessible storage medium (including, but not limited to, disk memory, CD-ROM, and optical memory) and containing computer accessible program codes. The computer program is stored/distributed in a suitable medium, which is provided together with other hardware or acts as a part of the hardware. The computer program may also be distributed in other forms, for example, via the Internet or other wired or wireless telecommunication systems.

The present disclosure is described with reference to flow charts and/or block diagrams of a method, apparatus (device) and computer program product of embodiments of the present disclosure. It should be understood that, each flow and/or block in the flow charts and/or block diagrams, and a combination of flows and/or blocks in the flow charts and/or block diagrams may be implemented by computer program instructions. These computer program instructions may be provided to a general-purpose computer, a dedicated computer, an embedded processor, or a processor of other programmable data processing device to produce a machine, such that the instructions executed by the computer or the processor of other programmable data processing device generate an apparatus for implementing functions specified in one or more flows of the flow chart and/or one or more blocks in the block diagram.

These computer program instructions may also be stored in a computer readable memory that can guide the computer or the other programmable data processing devices to work in a special way, such that the instructions stored in the computer readable memory generate a manufactured article including a command device. The command device implements functions specified in one or more flows of the flow chart and/or one or more blocks in the block diagram.

These computer program instructions may also be loaded to the computer or the other programmable data processing devices, such that a series of operations is executed on the computer or the other programmable data processing devices to generate processing implemented by the computer, and thus the instructions executed on the computer or the other programmable data processing devices provide operations for implementing functions specified in one or more flows of the flow chart and/or one or more blocks in the block diagram.

Although the present disclosure is described in combination with specific feature and embodiments thereof, it is obvious that various modification and combination can be made without departing form the spirit and the scope of the present disclosure. Accordingly, the specification and the drawings are merely exemplary illustration of the present disclosure defined by the appending claims, and are regarded to cover any and all modification, change, combination or equivalent in the scope of the present disclosure. Obviously, those skilled in the art may make various change and variants to the present disclosure, without departing from the spirit and the scope of the present disclosure. In this case, when these change and variants of the present disclosure belong to the scope of the claims and the equivalent technologies, the present disclosure intends to include these change and variants.

What is claimed is:

1. A control method of an electronic device, applicable to an electronic device, wherein the electronic device is provided with a flexible screen and a fingerprint sensor, and the method comprises:
    obtaining fingerprint data when detecting that the fingerprint sensor is pressed;
    matching the fingerprint data with preset fingerprint data;
    executing an unfolding operation on the flexible screen when the fingerprint data matches the preset fingerprint data successfully,
    wherein before executing the unfolding operation on the flexible screen, the method further comprises: determining a matching value between the fingerprint data and the preset fingerprint data;
    wherein executing the unfolding operation on the flexible screen comprises: executing the unfolding operation on the flexible screen according to the matching value;
    wherein executing the unfolding operation on the flexible screen according to the matching value comprises:
    fully unfolding the flexible screen when the matching value is greater than a preset threshold, in which the matching value is greater than a fingerprint unlock threshold;
    determining an unfolding factor of the flexible screen corresponding to the matching value according to a formula of unfolding factor=(matching value−fingerprint unlock threshold)/(preset threshold−fingerprint unlock threshold) when the matching value is less than or equal to the preset threshold and greater than the fingerprint unlock threshold, and executing the unfolding operation on the flexible screen according to the unfolding factor;
    wherein, the fingerprint unlock threshold is a preset matching threshold between the fingerprint data and the preset fingerprint data.

2. The method according to claim 1, wherein obtaining the fingerprint data comprises:
    obtaining a fingerprint image and a press parameter of pressing the fingerprint sensor.

3. The method according to claim 2, wherein matching the fingerprint data with the preset fingerprint data comprises:
    matching the press parameter with a preset press parameter; and
    matching the fingerprint image with a preset fingerprint image when the press parameter matches the preset press parameter successfully, and executing the unfolding operation on the flexible screen when the fingerprint image matches the preset fingerprint image successfully.

4. The method according to claim 2, wherein matching the fingerprint data with the preset fingerprint data comprises:
    matching the fingerprint image with a preset fingerprint image; and
    matching the press parameter with a preset press parameter when the fingerprint image matches the preset fingerprint image successfully, and executing the unfolding operation on the flexible screen when the press parameter matches the preset press parameter successfully.

5. The method according to claim 1, further comprising:
    prompting a user to press the fingerprint sensor again when the fingerprint data fails to match the preset fingerprint data.

6. An electronic device, provided with a flexible screen and a fingerprint sensor, and comprising:
    an obtaining unit, configured to obtain fingerprint data when detecting that the fingerprint sensor is pressed;
    a matching unit, configured to match the fingerprint data obtained by the obtaining unit with preset fingerprint data; and
    an unfolding unit, configured to execute an unfolding operation on the flexible screen when a matching result of the matching unit is that the fingerprint data matches the preset fingerprint data successfully,
    wherein the electronic device further comprises:
    a determining unit, configured to determine a matching value between the fingerprint data and the preset fingerprint data before the unfolding unit executes the unfolding operation on the flexible screen;
    wherein, the unfolding unit is configured to: execute the unfolding operation on the flexible screen according to the matching value determined by the determining unit;
    wherein, the unfolding unit is configured to: fully unfold the flexible screen when the matching value is greater than a preset threshold, in which the matching value is greater than a fingerprint unlock threshold; determine an unfolding factor of the flexible screen corresponding to the matching value according to a formula of unfolding factor=(matching value−fingerprint unlock threshold)/(preset threshold−fingerprint unlock threshold) when the matching value is less than or equal to the preset threshold and greater than the fingerprint unlock threshold, and execute the unfolding operation on the flexible screen according to the unfolding factor;
    wherein, the fingerprint unlock threshold is a preset matching threshold between the fingerprint data and the preset fingerprint data.

7. The electronic device according to claim 6, wherein the obtaining unit is configured to:
    obtain a fingerprint image and a press parameter of pressing the fingerprint sensor.

8. The electronic device according to claim 7, wherein the matching unit is configured to:

match the press parameter with a preset press parameter; and match the fingerprint image with a preset fingerprint image when the press parameter matches the preset press parameter successfully, in which, when the fingerprint image matches the preset fingerprint image successfully, the unfolding unit execute the unfolding operation on the flexible screen.

9. The electronic device according to claim 7, wherein the matching unit is configured to:

match the fingerprint image with a preset fingerprint image; and match the press parameter with a preset press parameter when the fingerprint image matches the preset fingerprint image successfully, in which when the press parameter matches the preset press parameter successfully, the unfolding unit executes the unfolding operation on the flexible screen.

10. The electronic device according to claim 6, further comprising:

a prompting unit, configured to prompt a user to press the fingerprint sensor again when a matching result of the matching unit is that the fingerprint data fails to match the preset fingerprint data.

11. An electronic device, provided with a flexible screen and a fingerprint sensor, and comprising:

a processor and a memory;

wherein the processor is configured to perform a control method of the electronic device by calling codes or instructions stored in the memory, the control method comprising:

obtaining fingerprint data when detecting that the fingerprint sensor is pressed;

matching the fingerprint data with preset fingerprint data;

executing an unfolding operation on the flexible screen when the fingerprint data matches the preset fingerprint data successfully, wherein before executing the unfolding operation on the flexible screen, the method further comprises: determining a matching value between the fingerprint data and the preset fingerprint data;

wherein executing the unfolding operation on the flexible screen comprises: executing the unfolding operation on the flexible screen according to the matching value;

wherein executing the unfolding operation on the flexible screen according to the matching value comprises:

fully unfolding the flexible screen when the matching value is greater than a preset threshold, in which the matching value is greater than a fingerprint unlock threshold;

determining an unfolding factor of the flexible screen corresponding to the matching value according to a formula of unfolding factor=(matching value−fingerprint unlock threshold)/(preset threshold−fingerprint unlock threshold) when the matching value is less than or equal to the preset threshold and greater than the fingerprint unlock threshold, and executing the unfolding operation on the flexible screen according to the unfolding factor;

wherein, the fingerprint unlock threshold is a preset matching threshold between the fingerprint data and the preset fingerprint data.

12. The electronic device according to claim 11, wherein obtaining the fingerprint data comprises:

obtaining a fingerprint image and a press parameter of pressing the fingerprint sensor.

13. The electronic device according to claim 12, wherein matching the fingerprint data with the preset fingerprint data comprises:

matching the press parameter with a preset press parameter; and matching the fingerprint image with a preset fingerprint image when the press parameter matches the preset press parameter successfully, and executing the unfolding operation on the flexible screen when the fingerprint image matches the preset fingerprint image successfully.

14. The electronic device according to claim 12, wherein matching the fingerprint data with the preset fingerprint data comprises:

matching the fingerprint image with a preset fingerprint image; and matching the press parameter with a preset press parameter when the fingerprint image matches the preset fingerprint image successfully, and executing the unfolding operation on the flexible screen when the press parameter matches the preset press parameter successfully.

15. The electronic device according to claim 11, wherein the control method further comprises:

prompting a user to press the fingerprint sensor again when the fingerprint data fails to match the preset fingerprint data.

* * * * *